United States Patent [11] 3,609,690

[72] Inventors Irwin J. Nissman
Yonkers;
Alvin Goldman, New York, N.Y.; Gerald A. Pruden, Oakland, N.J.
[21] Appl. No. 867,192
[22] Filed Oct. 17, 1969
[45] Patented Sept. 28, 1971
[73] Assignee Holobeam, Inc.
Paramus, N.J.

[54] SECURE PERSONNEL ACCESS CONTROL SYSTEM
4 Claims, 5 Drawing Figs.

[52] U.S. Cl. 340/149 R, 340/149 A
[51] Int. Cl. H04q 9/00
[50] Field of Search 340/149; 235/61.7, 61.11

[56] References Cited
UNITED STATES PATENTS

| | | | |
|---|---|---|---|
| 3,221,304 | 11/1965 | Enikeieff et al. | 340/149 A |
| 3,430,200 | 2/1969 | Barney | 340/149 A |
| 3,465,289 | 9/1969 | Klein | 340/149 |
| 3,513,441 | 5/1970 | Schwend | 340/149 A |

*Primary Examiner*—Donald J. Yusko
*Attorney*—Sandoe, Hopgood and Calimafde

ABSTRACT: A system for identifying the bearer of an identification card wherein cryptographically encoded information on the card is compared to a randomly scrambled representation of a number privately known to the card bearer. Comparison is made by insertion of the identification card into a card-reading means, and by insertion of the privately known number into a number-receiving means, whereby the two numbers may be sent to a comparator on a digit basis. Should the comparison be exact, the card holder will be positively identified.

INVENTORS
IRWIN NISSMAN
ALVIN GOLDMAN
GERALD PRUDEN
BY Sandoe, Hopgood & Calimafde
ATTORNEYS

INVENTORS
IRWIN NISSMAN
ALVIN GOLDMAN
BY GERALD PRUDEN

Sandoe, Hopgood & Calimafde
ATTORNEYS

INVENTORS
IRWIN NISSMAN
ALVIN GOLDMAN
GERALD PRUDEN

BY Sandoe, Hopgood & Calimafde
ATTORNEYS

SECURE PERSONNEL ACCESS CONTROL SYSTEM

This invention relates to method and means for identifying the bearer of an identification card wherein the bearer must know a verification number which matches a binary-coded number carried on his card.

BACKGROUND OF THE INVENTION

A source of concern for the government and for corporations using personnel identification cards is the security of the system, i.e., how well the system will insure against access to classified areas by unauthorized personnel. At present, the system in general use typically involves an identification card which carries the signature of the bearer, his photograph, his clearance, the access zone to which he can be admitted, and perhaps other identifying data. Problems involved with the system arise from lost or stolen cards wherein the true owner's identity may be assumed and his signature forged. A photograph on the card provides some additional security; however, such cards may be counterfeited with a new photograph inserted in place of the old; and at any rate, appearances change and visual verification tends to be lenient.

SUMMARY OF THE INVENTION

In the present invention, a secure personnel access control system is provided wherein admittance to a classified area is denied unless the bearer of the card knows a particular code word, usually a decimal number, and unless the system is programmed to encode his number to correspond to encoded information on his identification card. The invention, therefore, provides a system in which personnel may be automatically denied entrance to any area for which their particular identification card is not programmed.

OBJECTS OF THE INVENTION

In view of the above it is an object of the present invention to provide method and means for securing classified areas from unauthorized personnel even though an identification card is lost, stolen or counterfeited.

Another object is to provide a system in which programmed access may be easily changed should compromise of the security system be suspected.

Other objects and many of the attendant advantages of the invention will be readily appreciated as the same becomes better understood with reference to the following detailed description considered in connection with the accompanying drawings in which like reference numerals designate like parts throughout the figures thereof.

DESCRIPTION OF THE INVENTION

Figure 1:
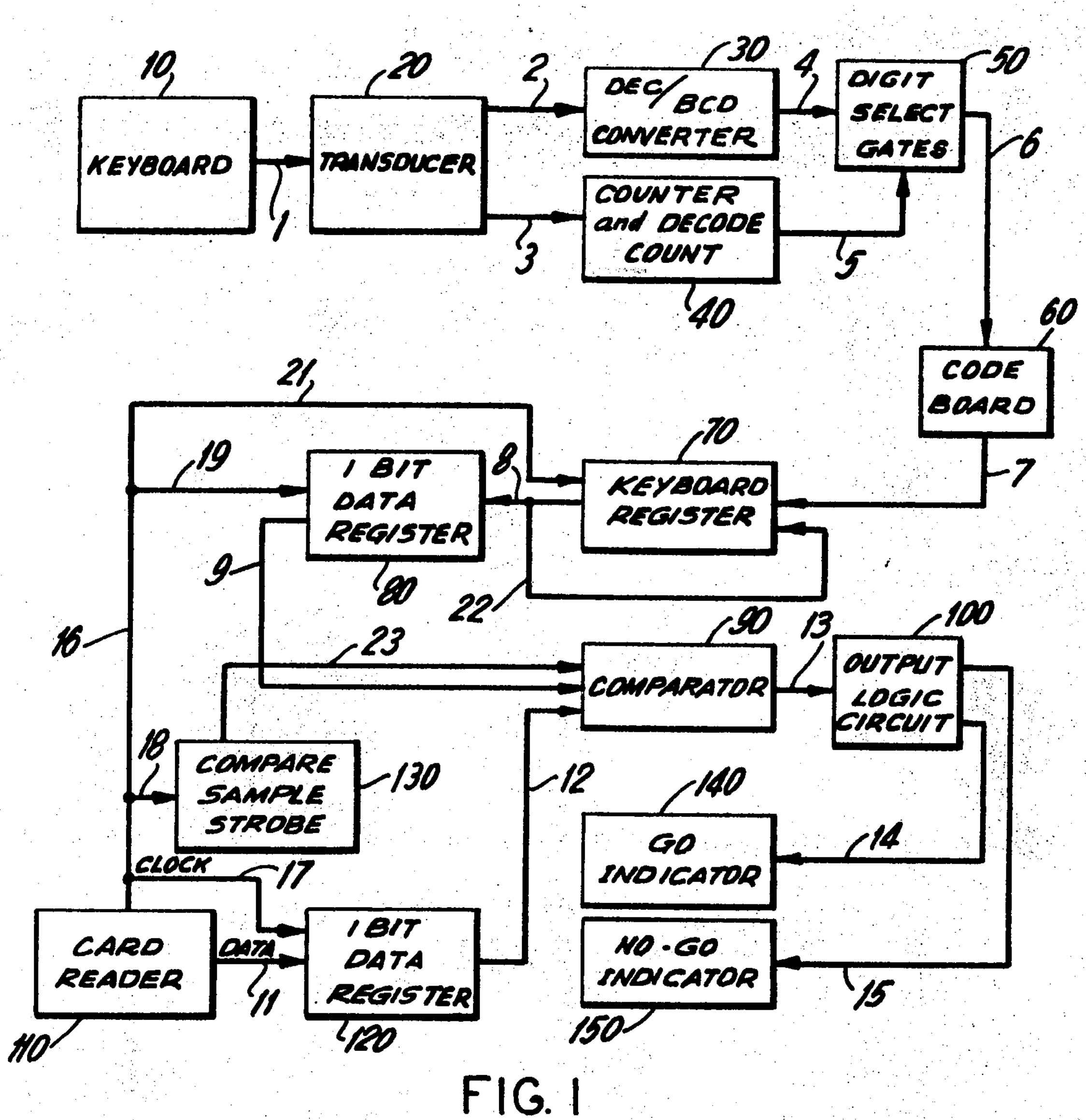
FIG. 1 is a functional block diagram of the system of the invention.

FIG. 1 represents an entrance station through which one cannot pass until receiving a "go" signal. The station is shown diagrammatically in block form and its description is included in a discussion of station operation below.

In operation the bearer of an identification card would approach the entrance station and, assuming the equipment is in a ready condition, would place his identification card into the card reader 110 and would insert a privately known code word, usually a decimal number, on the keyboard 10. The keyboard may be a standard punch or dial-type telephone keyboard containing numbers 0–9. The keyboard is connected through line 1 to a transducer 20 which translates the mechanical information dialed or punched into the keyboard into suitable electrical signals for application over line 2 to the decimal code to binary code converter 30. As is well known, the decimal numbers 0–9 may be represented by various specific combinations of four binary digits or bits. Therefore for each incoming digit of information on line 2 the converter will provide an output of four digits over line 4. By way of specific example, if the cardholder had inserted six decimal digits into keyboard 10 there would result 24 binary digits from the converter 30.

It will be noted that the transduced decimal information is also fed over line 3 from transducer 20 into the counter and decode count 40, which in turn supplies sequential enabling signals over line 5 to the digit select gates 50. For each decimal digit signal input received by the decode count, the output enabling signal opens four gates so that four bits of binary information per decimal digit are passed from the converter to the code board 60 over conductor 6.

Figure 2:
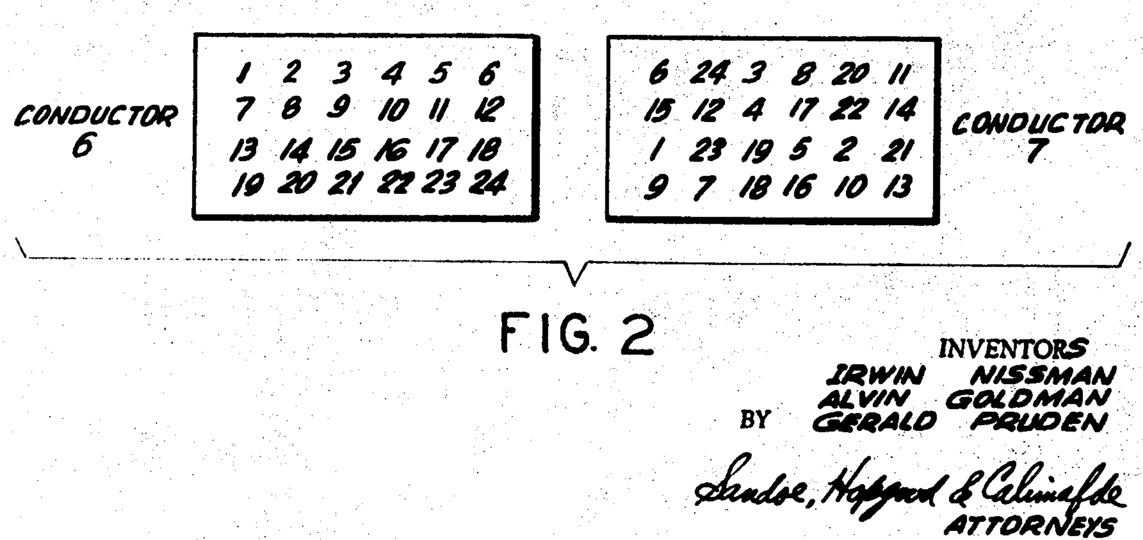
FIG. 2 is illustrative of terminals on the code board.

The code board 60 comprises a plugin-type terminal board into which the wires comprising conductors 6 and 7 may be connected. As shown in FIG. 2, there would be 24 such input terminals for the example case mentioned above. Each input terminal of code board 60 is connected in a completely random manner to the output terminals of the code board. With reference to FIG. 2, it may be seen that input terminal 1 is randomly connected to the output terminal occupying a space corresponding to input terminal 13; input terminal 2 is randomly connected to an output terminal occupying a space corresponding to input terminal 17; input terminal 3 is connected to output terminal 3; input terminal 4 is connected to an output terminal occupying a space corresponding to input terminal 9, etc.

In this manner a completely random selection of the binary-coded decimal input is fed over conductor 7 into the keyboard register 70. Therefore, as thus far described, the system has translated six decimal digits placed sequentially into keyboard 10 into a scrambled binary-coded equivalent stored in the register 70.

Figures 3, 4:
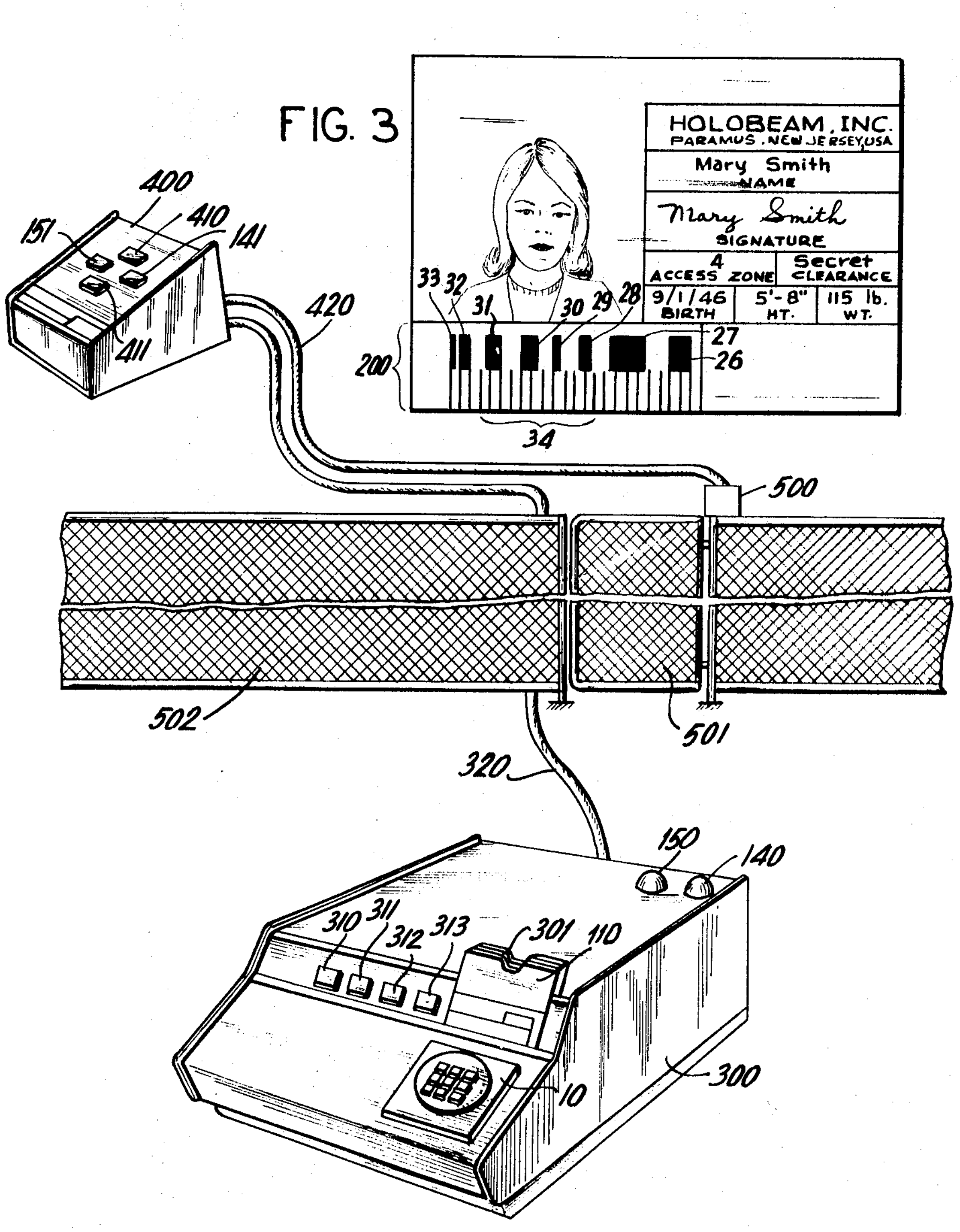
FIG. 3 shows a typical identification card used with the equipment of this invention clearly showing the encoded data.
FIG. 4 is a perspective view of the console equipment used in an embodiment of the invention.

Now consider the operation of the system in connection with the insertion of the identification card depicted in FIG. 3. Referring to the rectangular section 200 in the lower left-hand corner of the identification card, it will be noted that there are eight markings 26–33. These markings represent encoded data which, when read by the card reader 110, result in a succession of binary bits which should exactly match the scrambled succession of binary bits held in the keyboard register 70 (assuming the cardholder has correctly placed into the keyboard 10 his privately known decimal number and assuming the correct code board is in use). The fact that FIG. 3 contains eight such markings is purely for illustration; the actual number of markings could and would vary with the privately known number and with the particular scramble code wired into code board 60. Therefore, it is clear that the identification card and the code board must be matched to have a workable system. Each time a new code board is inserted into the system, new identification cards with corresponding scrambled coding must be issued.

Referring again to FIG. 3, in the box 200 there are several vertical markings generally designated 34. These markings are clock markings, and in the system depicted the card would carry one clock marking per binary-coded digit. Therefore, in the example discussed above where there are 24 binary digits, the card would contain 24 vertical clock markings. As the card is sequentially read, each clock pulse marking will either correspond with a coded pulse marking 26–33, or will not. Where there is a correspondence, a binary digit signal of, for example, "state 1" will be produced; where there is no correspondence, a signal "state 0" will be produced. In either event, the signal from card reader 11 is sent as data output over line 11 to the one bit data register 120 as may be seen with reference to the block diagram of FIG. 1. Also, the clock pulse from card reader 11 is sent over lines 16 and 17 to the one bit data register 120, over lines 16 and 18 to the compare sample strobe 130, over lines 16 and 19 to the one bit data register 80, and over lines 16 and 21 to the keyboard register 70. The result of the operation is to take the first bit stored in the keyboard register 70, and transfer it to the one bit data register 80 and then to the comparator 90; also the first data bit from the card is loaded into the one bit data register 120 and then sent to the comparator 90. The comparator operation is initiated by a strobe pulse produced by sample strobe 130 which is slightly delayed in time from the clock pulse.

When the card reader reads the next clock pulse, it again senses either a corresponding code marking or lack of such marking on the identification card. That information is sent over line 11 to the one bit data register 120 and then to comparator 90. The second clock pulse is sent out over line 16 and connecting lines to the strobe 130, to registers 80 and 120, and to the keyboard register 70 in order to transfer a second bit of digital information out of register 70 to the one bit data register and comparator 90. In like manner, all 24 data bits are transferred from register 70 and from the card into the comparator.

In the comparator 90, the data bits from the scrambled binary bits corresponding to the decimal number inserted into keyboard 10, and the data bits from the identification card inserted into card reader 110 are compared bit by bit in the following manner. The trailing edge of the clock pulse sent over line 18 to compare sample strobe 130 initiates the compare sample strobe pulse. The delay occasioned by utilizing the trailing edge of the clock pulse is designed to insure the total presence of the two corresponding data bits from registers 80 and 120 in the comparator before the comparison is made. The fractional delay also allows for the total removal of any bits previously stored in the comparator. When the delayed clock pulse reaches the comparator, it should be in readiness and the comparison of the two information bits is triggered. The resulting correspondence or lack of correspondence produces an appropriate signal which is passed along line 13 into the output logic circuit 100 where the information is stored until all data bits have been compared.

When the comparison is completed, the output logic circuit 100 will produce either a "go" signal over line 14 or a "no go" signal over line 15 to the proper indicator. At this point, the gate to the entrance of the classified area may be automatic or manually opened in response to a "go" signal.

DESCRIPTION OF A SPECIFIC EMBODIMENT

FIG. 4 shows, in perspective, a particular embodiment of the system described above. There is depicted an admission station with a personnel gate 501 providing an access through a fence or wall 502 which separates the entrance area from the classified area.

A card reader console 300 is shown in the entrance area containing a keyboard 10 and a card reader 110. A slot for inserting the cardholder's identification card is shown at 301. "-Go" and "no go" indicator lights are shown on the card reader console together with four indicator lamps which provide operational instructions to the cardholder. Indicator lamp 310, when lit, instructs the cardholder to insert his identification card. Indicator lamp 311, when lit, instructs the cardholder to enter his privately known decimal number on the 10-digit manual input keyboard 10. Indicator lamp 312, when lit, instructs the cardholder to remove his identification card. Indicator lamp-switch 313, when lit, informs the cardholder that he has made an error and that he must push the lamp-switch 313 to reset the system if he wishes to again attempt entrance.

A remote control console 400 is shown in the classified area where, in this embodiment, a guard might sit. On the remote control console an indicator lamp-switch 410 shows whether the power is on or off. Indicator lamp-switch 141 indicates an entry permit, while indicator lamp 151 indicates entry denied. Lamp-switch 411 is a siren reset. Cable 320 connects the card reader console with the remote control console with an electrical control gate operation shown generally at 500.

Operation of this embodiment will now be described in reference to the logic diagram of FIG. 5 together with the perspective drawing FIG. 4.

Figure 5:
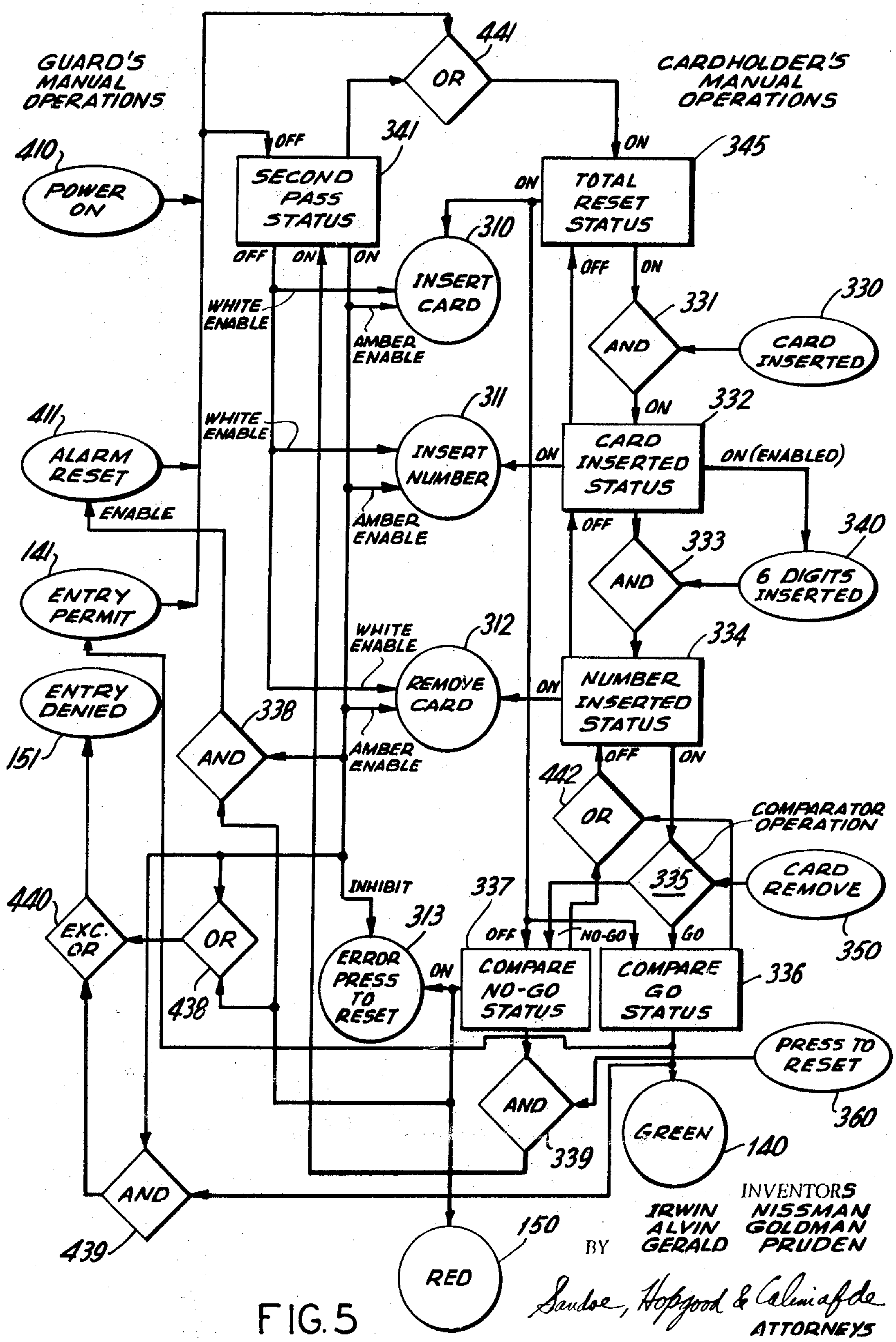
FIG. 5 is a logic diagram illustrating the use of the equipment depicted in FIG. 4.

In FIG. 5, shown generally at the left side of the figure, are the guard's manual operations designated 410, 411, and 141, together with the "entry denied" signal lamp 151. At the right of the figure are the cardholder's manual operations designated generally 330, 340, 350, and 360. The indicator lamps 310–313, shown on the card reader console in FIG. 4, are to be found in the center of FIG. 5.

To begin the operation, the guard must first press the power on lamp-switch 410. Pressing the power on switch energizes the total reset status circuit 345 or "ready" circuit through logic circuit 441; and results in turning on the white indicator lamp 310 and sending a signal to the logic circuit 331. When a cardholder approaches the entrance station and observes the insert card instruction on white lamp 310, he may then insert his card as at 330. Insertion of the card produces a signal into the logic circuit 331 which, together with the ready status signal already received, produces an output into the card inserted status circuit 332. Circuit 332 provides a signal for turning on the insert number white lamp 311 and for turning off the status circuit 345. Also, a signal is provided to logic circuit 333 and an enabling signal is sent to the keyboard 10. The cardholder now inserts his privately known decimal number into the keyboard 10 of FIG. 4 as shown by the operational block 340. Inserting the number produces a signal for the logic circuit 333 which, together with the previously received signal, produces an output to turn on the number-inserted status circuit 334. Circuit 334 turns off status circuit 332, provides a signal to the logic circuit 335, and turns on indicator lamp 312. Lamp 312 instructs the cardholder to remove his card, which operation is shown at 350. Removing the card produces a second signal to the logic circuit 335 which, together with the signal received from the number-inserted status circuit, produces a comparator operation 335. The result of the comparator operation is to provide either a "go" signal or a "no go" signal to the appropriate status circuit, 336 or 337. If the comparison indicates correspondence, a "go" signal is produced which energizes circuit 336, turns off status circuit 334 through logic circuit 442, and which lights the green indicator lamp 140 and the entry permit lamp-switch 141. The guard would then press the entry permit lamp-switch 141 causing a signal to be sent to the total reset status circuit 345. Circuit 345 then provides a ready signal for the next cardholder operation, and turns off the "go" status circuit 336. Pressing the switch 141 also provides a signal over cable 420 in FIG. 4, to the control gate operation 500 in order that gate 501 can be opened for the cardholder.

Should the result of the comparator operation 335 produce a "no go" signal activating the status circuit 337, a signal would be produced which energizes indicator lamp 313 to indicate the error and the necessity of pressing lamp-switch 313 to reset the circuit. A signal would also be provided to the red indicator lamp 150 on the card reader console as well as to the logic circuits 338, 339, and through 438 and 440 to the "entry denied" signal lamp 151. The press to reset operation, shown generally at 360, produces a signal for the logic circuit 339 which, together with the "no go" status signal, produces an output which is sent to the second pass status circuit 341. This in turn produces a signal for inhibiting the error press reset indicator 313 and for providing "amber enable" signals to indicators 310, 311, and 312. The second pass status circuit also provides a signal to the total reset status circuit 345 through logic circuit 441. Status circuit 345 turns off status circuit 337. Note that status circuit 341 remains energized throughout the second pass and enables amber bulbs to light at 310, 311, and 312.

The cardholder may now go through his operations a second time, inserting his card 330 which will provide a signal to the card-inserted status circuit 332 and allow the cardholder to insert his six digit privately known number a second time. Once that number is inserted, he will be instructed to remove his card and the comparator operation will be carried out as before. If a "go" signal is produced, the entry denied lamp 151 will be turned off through logic circuits 439 and 440, and entry permit lamp 141 will light on the guard's console allowing the guard to open the gate for the cardholder; however, if a second "no go" status signal is produced, a signal will be sent to the logic circuit 338 which, together with the second pass status signal, will turn on the alarm at the guard's desk telling him that the cardholder has twice performed the operation incorrectly. The guard may reset the alarm and reset the circuit by pressing the lamp-switch 411.

Thus, it is seen that a system has been provided for guarding against improper entry into classified areas of defense plants, corporations, banks, etc. In the system of the invention, no one can gain entry unless he possesses an identification card bearing encoded information, unless he knows a privately known decimal number, and further, unless the coded information on the card corresponds to the decimal number after it has been scrambled in a random manner into binary codes.

One important feature of this invention is the practical impossibility of chance failure. In the six decimal digit example used throughout the disclosure, the 24 binary bits are controlled by a code board wherein there are 16,777,216 possible different matrix arrangements of the two state bit information. Thus, the chance is approximately one in 16.8 million for an unauthorized person to counterfeit a card and gain access with it. Should the identification cards be keyed by a selected digit assignment of one digit of the six digit number so that the card may be restricted to a particular reading station out of several stations, chance failure is increased but only to a slight degree.

Various uses of the invention besides the described identification system may be readily envisaged. These would include credit card systems and automatic record keeping systems when interfaced with digital computers.

Various types of equipment may be employed in carrying out the system of the invention; for example, with reference to the card reader 110, the card may be scanned optically; there may be variations in such optical scanning; it may be scanned magnetically; it may be scanned electrically, or by any other appropriate means. All such variations of equivalent equipment, are, of course, included within the scope of the described invention.

While the principles of the invention have been illustrated in connection with a specific embodiment, it is to be clearly understood that this description is made only by way of example and not as a limitation to the scope of the invention as set forth in the accompanying claims.

What is claimed is:

1. A personnel identification system for identifying the bearer of an identification card comprising code word receiving means into which a code may be manually inserted by the card bearer, a binary code converter connected to said code word receiving means for converting said code word into a corresponding binary signal, coding means connected to said binary code converter for scrambling each binary bit of said binary signal in a predetermined random manner, first means connected to said coding means for storing the scrambled binary representation of the input code word, card-reading means for receiving an identification card carried by the card bearer, second storage means coupled to said card-reading means, said card including cryptographically encoded data, said card reader including means for sequentially scanning the identification card and for sending a series of binary bits representing the card-encoded data to said second storage means in a sequential order, a comparator coupled to said first and second storage means, and clock pulse means for transferring the scrambled data from said first storage means to said comparator and for transferring the card-encoded data from said second storage means to said comparator on a bit-by-bit basis so that a bit-by-bit comparison of the card-encoded data and the scrambled data may be performed at said comparator.

2. The system defined in claim 1, wherein said clock pulse means triggers said comparator, and further comprising delay means coupled between said clock pulse means and said comparator for fractionally delaying the triggering of said comparator so that data transfer to and from said comparator is complete prior to the initiation of comparator operation.

3. The system defined in claim 2, further comprising an output logic circuit, wherein bit-by-bit comparison information indicating bit correspondence or lack of correspondence is received from said comparator and stored in said output logic circuit until the entire comparator operation is complete, and "go" indicator means and "no go" indicator means each connected to said output logic circuit for indicating a complete word correspondence or lack of bit correspondence upon the completion of comparator operation.

4. The system of claim 8, in which said clock pulse means comprises means for deriving clock pulses from the data encoded on said card.